July 1, 1952 F. C. DOUGHMAN Re. 23,516

PRESSURE RESPONSIVE CONTROL DEVICE FOR VACUUM CLEANERS

Original Filed June 12, 1946 4 Sheets-Sheet 1

INVENTOR.
FERMAN C. DOUGHMAN
BY
R. T. Spency
ATTORNEY.

PRESSURE RESPONSIVE CONTROL DEVICE FOR VACUUM CLEANERS

Original Filed June 12, 1946 4 Sheets-Sheet 2

INVENTOR.
FERMAN C. DOUGHMAN
BY A. T. Spaeny
ATTORNEY.

PRESSURE RESPONSIVE CONTROL DEVICE FOR VACUUM CLEANERS

Original Filed June 12, 1946 4 Sheets-Sheet 3

INVENTOR.
FERMAN C. DOUGHMAN
BY
R. T. Sperry
ATTORNEY

PRESSURE RESPONSIVE CONTROL DEVICE FOR VACUUM CLEANERS

Original Filed June 12, 1946 4 Sheets-Sheet 4

INVENTOR.
FERMAN C. DOUGHMAN
BY A. T. Sperry
ATTORNEY.

Reissued July 1, 1952

Re. 23,516

UNITED STATES PATENT OFFICE 23,516

PRESSURE RESPONSIVE CONTROL DEVICE FOR VACUUM CLEANERS

Ferman C. Doughman, Darien, Conn., assignor to Electrolux Corporation, Old Greenwich, Conn., a corporation of Delaware Original No. 2,580,643, dated January 1, 1952, Serial No. 676,318, June 12, 1946. Application for reissue March 25, 1952, Serial No. 278,366

22 Claims. (Cl. 183—37)

Matter enclosed in heavy brackets [ ] appears in the original patent but forms no part of this reissue specification; matter printed in italics indicates the additions made by reissue.

This invention relates to control devices and is particularly concerned with control devices which are responsive to pressure or suction characteristics of a fluid flow system. One practical application of the invention is for use in suction cleaners to control certain instrumentalities thereof in response to variations in the operating characteristics of the device.

More specifically one preferred application of the broad inventive concept is for the electrical control of certain suction cleaner functions in response to a decrease in cleaning efficiency due to a decrease of air flow at the suction nozzle, such decrease of air flow being responsive among other things to the amount of accumulated dirt in the dust separating and receiving element. Thus the device functions in response to a requirement for the cleaning or exchanging of the dust separating element.

Throughout the following specification the operating characteristics are discussed in terms of suction measured in inches of water which such suction will displace in a manometer. Air flow is referred to in terms of cubic feet per minute. The flow of air through a cleaning nozzle is caused by certain suction characteristics at various points in the system. Otherwise stated, pressure differences are caused to exist whereby air flow is induced, however, since such pressure differences are manifest as air flow and as suction, it is believed that a clearer and more accurate understanding of the invention may be had by reference to such manifestation rather than to the absolute pressure. The term "vacuum" is sometimes loosely and even inaccurately applied in the present art and for that reason is herein avoided, but it will be understood that where suction and air flow are here discussed they may be interpreted in terms of absolute pressures, pressure differences or the "application" of vacuum. Obviously no such arbitrary choice of language may be resorted to as a means for distinguishing the present inventive concept from similar developments in the art to which this invention relates.

While the present disclosure uses the conventional expression "suction cleaner" as a generic term for the device to which the inventive concept is here applied, it will be understood that the invention is broadly applicable to pressure systems or flow devices other than suction cleaners. For the purpose of this disclosure the term "suction cleaner" refers to domestic cleaning devices in which suction induces air flow from the surface to be cleaned through a dust separating and retaining member usually a porous bag through which clean air passes leaving dust and dirt entrained by the air flow within the bag. Obviously the inventive concept is applicable to other types of suction cleaners as for instance, those wherein non-removable dust separating means are employed. The specific embodiment discloses the invention applied to a cleaner in which the bag is mounted between the cleaning nozzle and a motor-fan unit, but it will be understood that it may be equally well applied to cleaners in which the bag is applied to the exhaust of the fan as with so-called "bag-on-handle" cleaners.

As is readily understood by those skilled in the art, the cleaning efficiency of "suction cleaners" is directly responsive to the velocity of air flow at the surface being cleaned. Such velocity is responsive to the restrictive affects of the free area permitting air flow at the surface being cleaned, the restrictive characteristics of the suction hose or passage between the nozzle and the cleaner body, and the restrictive affect of the dust separator as well as the primary suction induced by the motor-fan unit of the device. While the restrictive affect of the hose is a separate element of the total restrictions of the system and varies with rate of flow, it adds to the nozzle and cover orifice restrictions to form a total "before the bag" restriction and consequent pressure drop. Thus in the following consideration these total restrictions are spoken of in terms of nozzle restriction alone since with each nozzle the hose and cover are a necessary additive restriction. Assuming that the primary suction induced by the fan is directly responsive to the accumulated sum of these flow restrictions, ignoring for the sake of clarity, the possible "change under load" of certain types of motors which may be used, then the air flow for any given nozzle restriction will be directly responsive to the amount of suction induced by the fan and the amount of restriction to flow imposed by the characteristics of the dust separator.

The amount of air flow for a given nozzle restriction may thus be determined by a measurement of the primary suction at the fan and a measurement of the suction inwardly of the nozzle. Since the restrictiveness of the hose or passage from nozzle to separator is a factor of air flow through the nozzle, this latter suction may in the structure herein depicted be taken by a reading directly in front of the dust separator. Such readings will, of course, give a direct measure of the restrictive affect of the dust separator. It will, of course, be recognized that during cleaning accumulated dirt in the dust bag tends to fill the interstices of the bag, thus reducing free flow of clean air therethrough. Such resistance works against the efforts of the motor-fan unit to maintain air flow through the cleaning nozzle and a point is reached at which time the cleaning efficiency is so reduced that the emptying or changing the dust bag is required.

Since the adequate air flow is a factor of the nozzle resistance as well as dust separator resistance, it will be seen that mere bag resistance is not a reliable guide for determining the operating efficiency of the device. Thus neither the weight nor volume or accumulated dirt nor the pressure drop through the bag should be relied on to operate a control system. Furthermore, since both the suction before the fan and the suction before the dust separator vary for different rates of air flow even though such rates may be adequate for the type of nozzle being employed a proper control system cannot rely on either one or the other of such suctions alone.

From the foregoing, it will be seen that a control system, which is jointly responsive to the suction at the inlet of the fan and to the suction which induces flow through the nozzle, hence will be responsive to the actual cleaning efficiency at any given time. Such a system constitutes the essence of the present inventive concept.

In cleaners currently in use, it is frequently difficult or impossible for the operator to properly gauge the point at which the continuously decreasing efficiency renders her efforts unprofitable. Attempts have been made to design control systems for gauges and indicators which will produce visual or audible signals to call the operator's attention to the fact that the bag should be emptied or changed and in certain types of cleaners, designed to automatically open and eject, or present for removal, the dust bag when it is full, control devices are desired which are responsive to the decreasing of efficiency above referred to. The present invention is herein disclosed as fulfilling this requirement.

The present invention is directed to a control means responsive to suction measured at spaced points in a flow system and may be generally defined as comprising a pair of suction responsive elements; one of which is arranged to respond to the suction which produces inflow of air from the cleaning nozzle, while the other is arranged to respond to the suction which produces outflow of air from the bag. Both of these devices cooperate to control some associated instrumentality in response to predetermined variations in such pressures.

It is among the primary objects of the invention to provide a control device which will be responsive to a given relationship of suctions within a fluid flow system.

A further object of the invention is to provide a control system applicable to suction cleaners which will control a circuit in response to predetermined variations in the cleaning characteristics of the cleaner.

A further object of the invention is to provide a control circuit for suction cleaners which will operate to terminate the cleaning operation thereof in response to a predetermined decrease in the cleaning efficiency of the apparatus.

Another object of the invention is to provide a control system for suction cleaners which is directly responsive to the velocity of air flow at the cleaning nozzle.

Another object of the invention is to provide a control system which will not be affected by variations in fluid flow caused by extraneous forces acting beyond the points of application of the control system.

Numerous other objects and features of the present invention will be understood from a consideration of the following specification taken in conjunction with the accompanying drawings, in which.

Figure 1:
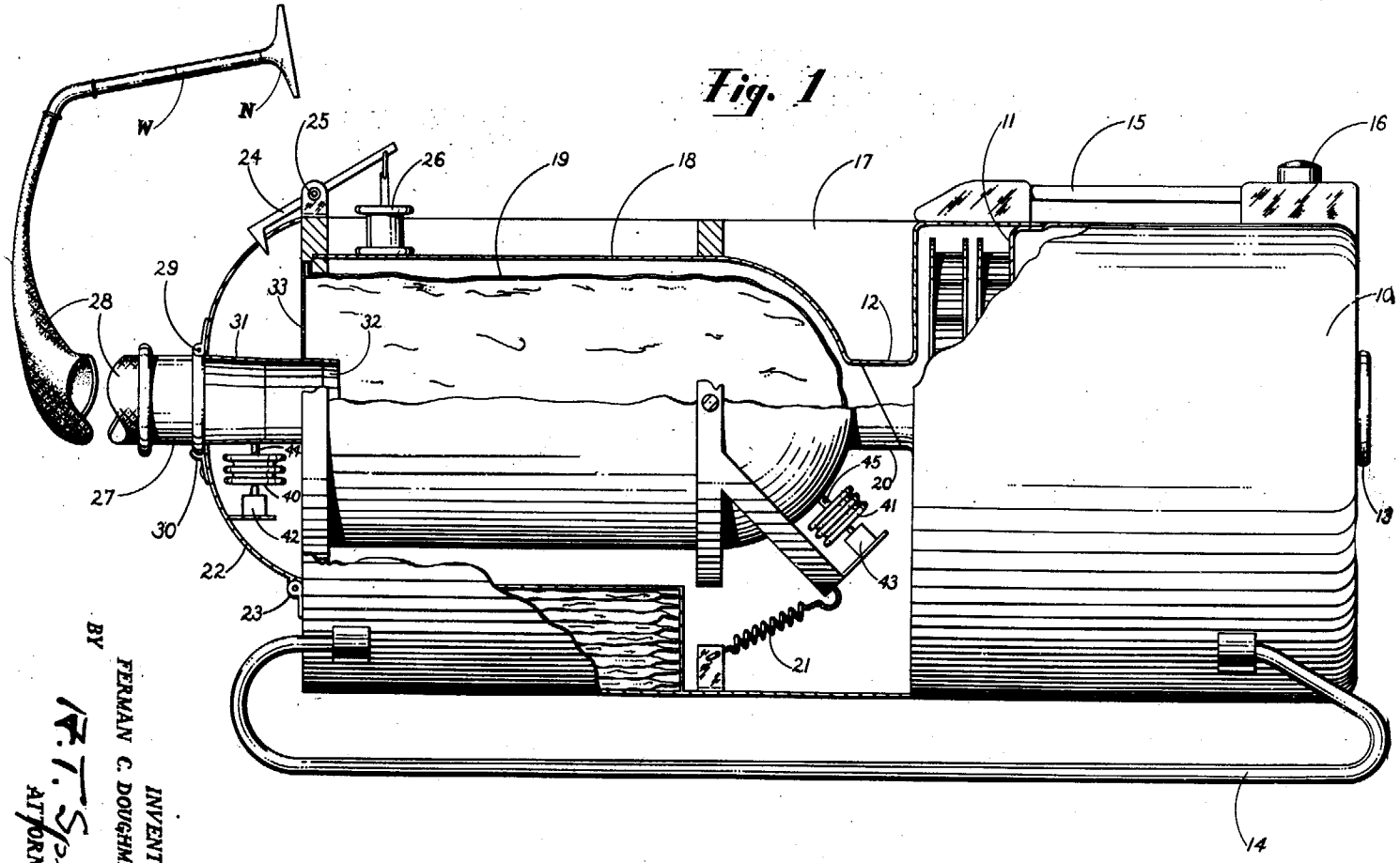
Fig. 1 illustrates the system as applied to one type of vacuum cleaner.

In the present embodiment of the invention, the suction responsive device comprises a pair of Sylphon bellows, each of which controls a microswitch. The microswitches are placed in series in a control circuit, the arrangement being such that the control circuit is energized only when both of the microswitches are closed in response to their actuation by the Sylphon bellows. In the present disclosure, the inventive concept is applied to a suction cleaner, wherein one of the Sylphons is in communication with the air passage leading from the cleaning nozzle, while the other is arranged to be in communication with the suction utilized to induce flow through the dust bag. The arrangement is such that when the suction in front of the bag falls between a predetermined point thus diminishing the air flow at the nozzle, the first Sylphon will close its microswitch, while the second microswitch will be closed when a predetermined suction pressure is established in front of the fan. When the motorfan unit is running suction will be induced such as to cause the second microswitch to be closed and therefore, if adequate flow is prevented through the nozzle, it will be registered by decreasing suction in the passage from nozzle to bag and the first microswitch will close, thus completing energization of the control circuit.

While the presentation of the invention discloses its application to a tank type cleaner which is arranged to be opened in response to decrease in efficiency and the control circuit is arranged to actuate the opening mechanism, it will be understood that the circuit may have various other applications, both in and out of the suction cleaner field. The circuit may, of course actuate a signal device instead of the opening mechanism or may be arranged to operate a signal device and/or to control the motor as well as actuating the opening device.

Referring more particularly to the drawings, the present invention is disclosed as applied to a novel tank type vacuum cleaner, the structure of which is disclosed in detail in the copending application of Gustaf Einar Lofgren filed July 2, 1946, Serial No. 681,074 (now U. S. Patent 2,534,280 dated December 19, 1950). In view of the detailed disclosure of the above-identified application to which reference may be had, it will suffice to describe the cleaner as a floor supported tank type cleaner having a body 10 within which is mounted a motor-fan unit 11 adapted to draw air in through the body inlet 12, and discharge the same through the body outlet 13. Sleighs 14 support the structure in slightly spaced relation from the floor and a handle 15 is provided for carrying the device. Mounted at one end of the handle there is a switch button 16 to provide manual control of the motor unit 11, the arrangement being such that the button may be conveniently actuated by the foot of the operator. As will be hereinafter described, means responsive to the control system may also actuate the switch 16.

Forwardly of the body 10 a housing 17 extends, between the walls of which is pivotally mounted a chamber 18 which encloses a dust receptacle. The rear end of the chamber 18 is provided with an air outlet 20 of such configuration as to sealingly engage the inlet 12 when the casing is in horizontal position as shown in Fig. 1. The chamber 18 is biased to the tilted position shown in Fig. 2 by spring 21. The front of the chamber is normally closed by front cover 22 pivoted as at 23 to the housing 17. A latch 24 pivoted as at 25 upon the chamber 18 is provided to perform the dual function of securing the cover 22 closed and securing the chamber 18 in its horizontal and operative position. Latch 24 is connected for operation by a solenoid 26, mounted upon the chamber 18, which engages the latch 24 so that upon energization of the solenoid, the latch will pivot clockwise to release the cover, permitting the spring 21 to tilt the casing to the position shown in Fig. 2, thus presenting the dust bag for ready removal from the chamber.

If desired, ejecting means may be employed, as disclosed in the copending application above referred to, for ejecting the dust receptacle when the housing is tilted.

The front cover 22 is preferably provided with a hose receiving coupling 27, a hose 28 being removably secured therein and being adapted to receive suitable cleaning tools as commonly used in connection with tank type cleaners. As shown in Fig. 1 the hose while capable of direct attachment to a cleaning tool may lead to a tubular handle or wand W to which a floor or rug cleaning nozzle N is attached. The coupling 27 is pivotally mounted on the cover by hinge 29 and is normally secured in closed position by a spring latch 30, the arrangement being such that when the cover is open the coupling may move pivotally to permit cover movement without undue disturbance of the hose position. The cover is also provided with an inlet tube 31, the mouth 32 of which extends through end 33 of the dust receptacle 19 when the cover is closed and the device is in the operating position shown in Fig. 1.

The present structure is designed to use any one of various types of dust receptacles which are characterized by porous bodies usually having rigid covers, centrally apertured to receive the mouth 32 of the tube 31. These receptacles are preferably formed of paper, the central aperture of the cover being provided with a sealing device preferably arranged to seal against the mouth 32 and upon withdrawal of the tube, to close the bag to provide a sealed and disposable dust receptacle.

The control device of the present invention comprises a pair of Sylphon bellows 40 and 41 with which are associated microswitches 42 and 43. Tubes 44 and 45 communicate with the interior of the bellows 40 and 41, respectively. Externally the bellows are open to the atmosphere, the arrangement being such that variations in suction communicated to the Sylphons through the tubes will cause a responsive contraction or elongation thereof by which the microswitches will be actuated.

In the application of the present invention to the structure herein shown, the forward or inlet Sylphon 40 is connected by its tube 44 with the tube 31 whereby the Sylphon will be responsive to the suction within the tube 31 and thus to flow of air through the nozzle N with which it communicates through the hose 28. The rear or fan suction Sylphon 41 is connected by its tube 45 to the inside of the chamber 18 and thus is responsive to the suction within the casing, which suction is the primary motor-fan suction.

It will be understood that with a new or clean bag in the chamber 18 and with the housing closed as in Fig. 1 and the motor-fan unit operating the suction inside of chamber 18 will be communicated with minimum resistance to the inside of the bag 19 since air may readily flow through the pores of the bag. Similarly since the hose itself is designed to provide minimum resistance of air flow, a comparative suction will be obtained within the nozzle N. Such suction induces rapid inflow of air across the surface to be cleaned, thus entraining dust and dirt which is carried to the bag 19 and strained by the pores thereof, clean air being passed through to be discharged to the atmosphere.

Figure 2:
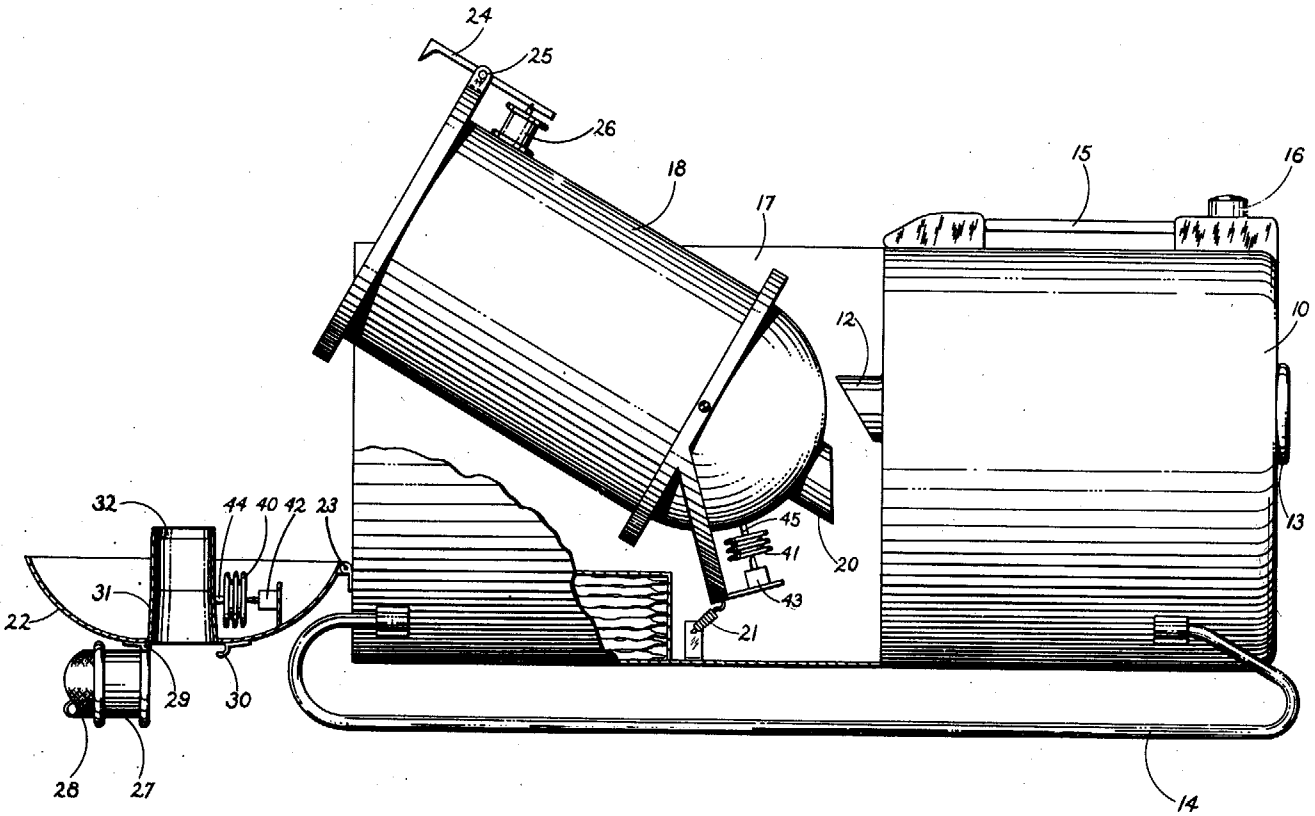
Fig. 2 is a view similar to Fig. 1 showing the relation of cleaner parts after actuation of the control device.
Figure 3:
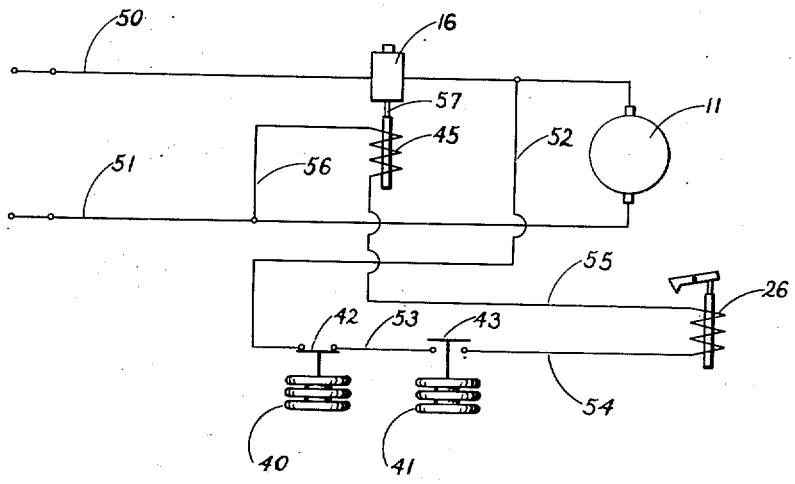
Fig. 3 is a diagrammatic illustration showing a circuit which may be used in connection with the present control system.

The invention includes a control circuit including the microswitches 42, 43, solenoid 26 and a switch operating coil 45 (not visible in Figs. 1 and 2). While various circuit arrangements may be advantageously employed depending upon the specific application of the broad inventive concept the present invention embraces a circuit of the type shown in Fig. 3, such circuit having particular advantages in the application of the invention to the specific cleaner structure of Figs. 1 and 2. In Fig. 3 the power supply line is represented by conductors 50 and 51. The conductor 50 leads through switch 16 to the motor 11, the return circuit being completed through conductor 51. The control circuit through microswitches 42, 43 and coils 26 and 45 comprises conductor 52 leading from conductor 50 at a point intermediate switch 16 and motor 11. From such intermediate point between switch 16 and motor 11, conductor 52 extends to microswitch 42 and thence by conductor 53 to microswitch 43, thus placing the microswitches in series. From microswitch 43 the control circuit extends through conductor 54 to coil 26 and thence by conductor 55 to coil 45, thus placing the coils in series with each other and in series with the microswitches 42 and 43. From coil 45 conductor 56 completes the control circuit by leading to conductor 51 constituting the other side of the line.

With the above circuit arrangement it will be seen that with switch 16 open and no power flowing to the motor 11 no energization will be provided for the control circuit. With switch 16 closed, the control circuit will be energized to the micro-switches and since the switches are in series, both must be closed in order to complete the circuit through the coils 26 and 45. With either one of the microswitches open, the control circuit is de-energized.

It will be noted that in the above arrangement, the action of Sylphon 40 and switch 42 is the reverse of that of Sylphon 41 and switch 43. Sylphon 40 is set to bias switch 42 to closed position when no suction is applied and the Sylphon 40 moves switch 42 to open position in response to the application of predetermined suction; conversely Sylphon 41 biases switch 43 to open position when no suction is applied and closes the switch in response to the application of predetermined suction.

In the present device with switch 16 open and the motor 11 de-energized, microswitch 42 is closed while microswitch 43 is open as shown in Fig. 3, the Sylphons 40 and 42 biasing the switches to these positions when no suction is applied. As will be more fully explained hereinafter, when switch 16 is closed and the motor 11 energized, the normal operating conditions of the cleaner will provide suction in Sylphon 40 causing switch 42 to open, while at the same time applying suction to Sylphon 41 closing or tending to close switch 43 and the control circuit will not be energized. When, during the operation of motor 11, suction applied to Sylphon 40 falls below a predetermined amount while suction applied to Sylphon 41 is such as to close or continue to retain switch 43 closed, the control circuit will be established, thus energizing coils 26 and 45. The energization of coil 26 releases latch 24 permitting cover 32 to open and chamber 18 to tilt upwardly. The energization of coil 45 will draw downwardly rod 57 connected with switch 16, the arrangement being such that downward movement of the rod 57 opens switch 16, thus de-energizing motor 11 as well as the control circuit. Similarly, if the suction maintained on Sylphon 40 is not sufficient to hold switch 41 open, while suction applied to 41 is less than the predetermined setting thereof, switch 43 will remain open and the control circuit will not be energized until the suction on Sylphon 41 increases sufficiently to close switch 43.

An important and advantageous feature of this circuit of the invention is the fact that the switch 16 dominates the control circuit including the microswitches 42 and 43. Upon energization of the control circuit, switch 16 is opened by coil 45 to thus interrupt the supply of current to the control circuit, and hence the microswitches 42 and 43 are never required to break the circuit while the latter is energized, but only to make it. During the operation of the device, while switches 42 and 43 may frequently open and close, they do so without transmitting current except when both are closed at the same time, whereupon the switch 16 is opened by coil 45. This arrangement provides a long useful life for the switches, since it is the arcing of switches upon breaking the circuit which contributes most to their wear and deterioration.

Figure 4:
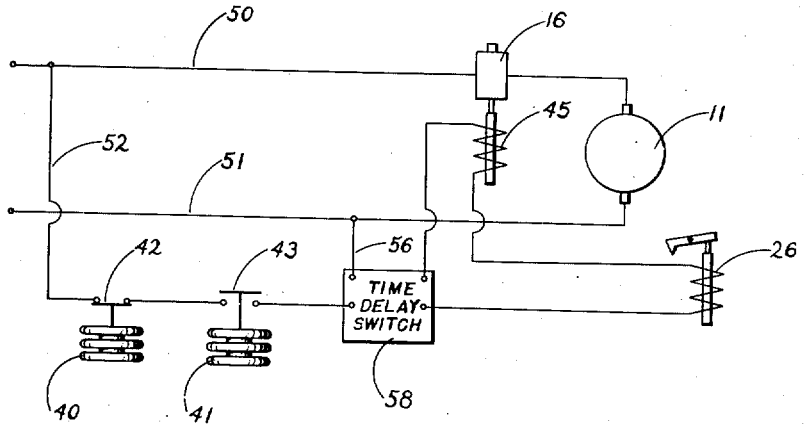
Fig. 4 is a view similar to Fig. 3 of a modification of the diagram of Fig. 3.

Fig. 4 of the drawings illustrates a modification of the circuit of Fig. 3 and provides a time delay device which in some instances may be desirable. As in Fig. 3 power is supplied to the circuit from a suitable outside source through conductors 50 and 51. The switch 16 is inserted in conductor 50 leading to one side of the motor 11, while the other side of the motor 11 is connected by conductor 51 to the other side of the line. The conductor 50 is also connected by a conductor 52 to microswitches 42 and 43 which are arranged in series and therefrom lead to the time delay switch indicated by the numeral 58. The return circuit from the time delay switch to the conductor 51 is indicated by the numeral 56. Unlike Fig. 3 in this circuit, conductor 52 is connected ahead of switch 16. This arrangement is such that when Sylphons 40 and 41 close both the microswitches 42 and 43, circuit is established to the time delay switch. Associated with the time delay switch is the solenoid 26 which operates the latch 24 and in series therewith a coil 45 which upon energization moves rod 57 connected with switch 16. When both switches 42 and 43 close and the circuit is first established through the microswitches and the time delay switch, no circuit is at first established through the coils 26 and 45. However, after a predetermined passage of time, suitable means within the time delay switch such as a thermally responsive element acts to include the coils 26 and 45 in the circuit, thus energizing them to actuate the latch 24, opening the cover of the cleaner and at the same time energizing coil 45 which moves rod 57 to open the switch 16, thus breaking the circuit to the motor 11. It will be seen that with the cover open and the housing tilted the Sylphons will return to their normal or non-operative position with the control circuit broken by one of the microswitches. The purpose of the time delay device in the present circuit is to prevent pressure surges or other purely temporary dislocations of the suction relationships from actuating the controller.

Figure 5:
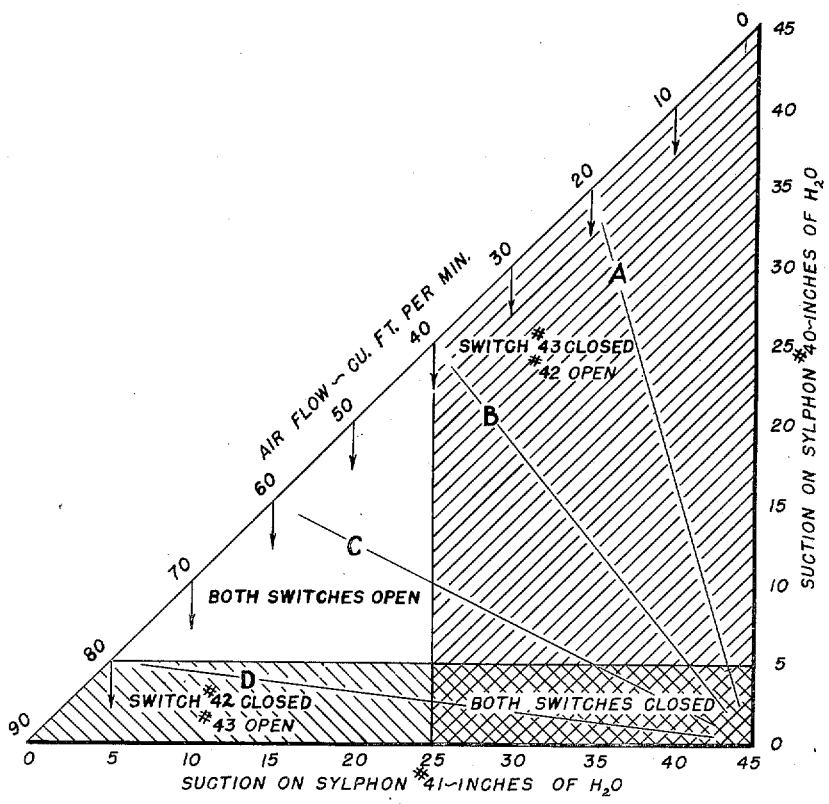
Fig. 5 is a graphical representation of the operation of the invention under various operating characteristics.

Referring now to Fig. 5, characteristics of suction conditions and air flow during the operation of the cleaner are graphically set forth. It will be understood that this figure presents a generalization of operating characteristics based upon the operation of one type of cleaner now on the market. Specific models of such cleaners may operate in a manner varying somewhat from the present graphical presentation and other types of cleaners may have operating characteristics more widely departing from the present presentation. However, the basic operating characteristics of all suction cleaners are therein depicted, although the quantitative data set forth may not always be in accord with the graph. In the graph the ordinate represents suction as applied to the Sylphon 40 and is calibrated upwardly from the abscissa in inches of water displaced in a manometer. The total suction here calibrated is forty-five inches. It will be understood, however, that different cleaners may have different total suction throughout the system and so an accurate graph therefor, would vary accordingly.

The abscissa of the graph represents suction at the motor head which is applied to the Sylphon 41 and is likewise calibrated in inches of water as measured by a manometer and depicts a maximum suction of forty-five inches in keeping with the maximum suction represented by the ordinate. Rate of air flow is represented on an hypotenuse and is calibrated in cubic feet of air flow per minute, the maximum flow for the suctions set forth being ninety cubic feet per minute. It will be observed that the air flow increases downwardly with respect to the ordinate and decreases as the suction depicted by the abscissa increases, thus there is zero air flow when maximum suction is reached by both Sylphons which would be the case in a sealed circuit with the motor in operation. Similarly a maximum air flow of ninety cubic feet per minute is depicted when the suction on both Sylphons 40 and 41 is zero. Obviously, with no suction there would be no air flow at all, but with decreasing resistance to flow, the volume per minute increases while the suction required to produce it decreases, and consequently the theoretical point of zero suction is approached, and the graph thus accurately depicts the fundamental operating characteristics.

In the graphical presentation of Fig. 5, the point of five inches of suction has been arbitrarily chosen as the point at which the microswitch 42 associated with Sylphon 40 is closed, the switch being open when the suction applied to the Sylphon 40 is greater than five inches of water, while the switch is closed when five or less inches of suction is applied to the Sylphon 40. With respect to the Sylphon 41, a point of twenty-five inches of suction has been arbitrarily selected as a point for operation of the microswitch 43 associated therewith, the switch being open when a suction of less than twenty-five inches of water is applied to the Sylphon 41 and being closed when greater suction is applied.

In the graph, the shading inclined upwardly to the right indicates the field in which Sylphon 41 has caused the switch 43 to close, while the shading inclined upwardly to the left depicts the area in which the Sylphon 40 has caused the switch 42 to be closed and thus the double shaded area depicts a field in which both switches are closed.

As indicated by the downwardly directed vertical arrows associated with the air flow line, it will be understood that the rate of air flow for a given point in the graph is to be read by projecting upwardly such point in a vertical line until it intersects the air flow line, thus at the upper left-hand corner of the double shaded area where five inch suction on the Sylphon 40 is maintained, while twenty-five inches of suction is maintained on the Sylphon 41, the flow of air will be forty cubic feet per minute. Again it is pointed out that these values are entirely approximate and may differ as between various cleaners of the same model and between various types of cleaners.

In Fig. 5 lines A, B, C and D have been drawn extending from spaced points on the air flow lines toward the junction of the ordinate and the abscissa where suction at the Sylphon 40 is zero and suction on the Sylphon 41 is maximum. In the operation of the cleaner, it will be understood that as resistance to flow increases through the filter bag, the difference between suction registered by the Sylphon 40 and that registered by the Sylphon 41 will increase and so for any given restriction of the nozzle and hose a line depicting the flow characteristic with such restriction will move downwardly and to the right of the graph as the resistance to flow by the bag increases, hence, the general radiating characteristic of the lines with respect to the juncture of the ordinate and abscissa. The uppermost of these lines, line A, which leads from a point of twenty cubic feet per minute of air flow which corresponds approximately with thirty-five inches of suction on Sylphon 40 and thirty-five inches on Sylphon 41 represents at its upper end a theoretical condition in which there is no pressure drop through the bag, but in which there is considerable flow resistance ahead of the bag and Sylphon 40, as would be caused by a very restricted cleaning nozzle. The line moves rapidly downward and more gradually to the right showing that as the bag increases its resistance due to the accumulation of dirt, the suction at Sylphon 40 will rapidly decrease, while the suction applied by the fan to Sylphon 41 will gradually increase for this type of restriction. While the entire path of line A lies within the shaded area which indicates that switch 43 is closed, the line enters the double shaded area at the point of five on the ordinate, thus the control circuit will be completed only at such point when switch 42 will be closed. At such point, rate of air flow as determined by projecting upwardly the point of intersection of line A with the abscissa for five inches of suction on Sylphon 40 will be seen to be something less than ten cubic feet per minute.

The line A is a characteristic representation of operating conditions when the nozzle exerts an extremely high restriction to air flow as when a rug cleaning nozzle is being held tightly against the nap of a rug being cleaned. The point of intersection of line A with the air flow line, represents the air flow with such a nozzle with a theoretically perfectly clean bag which offers no flow resistance and hence, the suction applied to Sylphons 40 and 41 are equal. Since no bag will actually have zero resistance, the intersection of lines A, B, C, and D with the air flow line is theoretical, but the line is accurate in depicting a decrease in Sylphon 40 suction and increase in Sylphon 41 suction as the bag resistance due to accumulated dirt increases.

An important characteristic of the present system which should be noted, is that with the highly restrictive nozzle orifice depicted by line A, total volume of air flow is quite small as compared with the air flow depicted by lines B, C and D. However, such high restriction may be the result of either a very small cleaning tool as used for upholstery cleaning or as a result of pressing the nozzle opening close against the surface being cleaned, in any event the total cross-section of air passage at the nozzle is quite small and hence, while volume of air flow is small, velocity of air flow is quite high and since air flow velocity at the nozzle is the main measure of cleaning efficiency, successful cleaning may be carried on with such a nozzle even though the air flow volume per minute is less than practical for less restrictive nozzles. Thus, the line A enters the double shaded control operating field at a point where relative suctions are more divergent and air flow much less than depicted by lines B, C and D.

Referring now to line D of Fig. 5, this line extends from a point of air flow of eighty cubic feet per minute on the air flow line towards the point of juncture of the ordinate and abscissa and represents the situation in which very little resistance to air flow by either the nozzle or the hose is present, or for instance, when the hose is removed from the cleaner. In this condition since the Sylphon 40 is arranged close to the hose coupling, it is subjected to substantial atmospheric pressure and the suction applied thereto will be below the abscissa of five inches for Sylphon 40 suction and thus with the machine operating under such conditions the line D will be at all times within the shaded area which represents that the switch 42 is closed. Under these conditions as the bag gradually increases its resistance, the suction on Sylphon 40 will further diminish slowly, while the suction applied to Sylphon 41 will rapidly increase with a consequent decrease in air flow. At a point of air flow of forty cubic feet per minute, the line D intersects the ordinate twenty-five at which point switch 43 will close to actuate the control circuit. It will be understood, of course, that with the hose removed from the cleaner, very little dirt will enter and the bag condition will change very slowly. However, since it is not desirable to have the control circuit actuated merely by a temporary removal of the hose when the bag is substantially clean, the point twenty-five has been elected for actuation of switch 43. It will be noted that although the volume of air flow is high at this point, the velocity is quite low since there is a maximum opening for the air flow.

Another advantageous characteristic of the present system is that, while it is possible to completely fill the bag with loose fibrous material such as rug nap, without causing a sufficient clogging of the bag to energize the control circuit, nevertheless, the circuit will be energized not by virtue of pressure drop through the bag, but as a result of clogging tube 31 and/or filling tube 44 blocking suction to Sylphon 40, thus closing switch 42.

Lines B and C represent flow characteristics when nozzles of intermediate restrictiveness are applied to the hose. Line B for instance, may be taken as representing flow characteristics when the rug cleaning nozzle referred to in connection with line A is raised somewhat from close contact with the surface being cleaned, in which case the available orifice for air flow at the nozzle is increased. However, with such increase, air velocity at the nozzle decreases. As the line B approaches the abscissa five, it will intersect it to enter the double shaded area and energize the control circuit at a point of considerably more than ten cubic feet per minute of air flow, but despite such increase in air flow since the nozzle opening is greater, the velocity is substantially the same. Thus, the cleaning efficiency at this point will be approximately the same as the cleaning efficiency at the point where line A intersects the abscissa five and thus, while the control circuit is responsive to increase in resistance due to the accumulation of dirt by the bag, it also is so arranged as to respond when cleaning efficiency, due to velocity decrease at the nozzle, falls below a predetermined point.

Similarly, line C represents the air flow when nozzle resistance is further decreased as in the use of floor brushes. In this case air flow is high, but since resistance is low the cleaner will operate for some time before the line C enters either of the shaded areas. At a point representing forty cubic feet per minute flow, the lint C enters the upper shaded area, at which point the microswitch 43 will be closed, however, due to the condition of the bag, suction applied to the Sylphon 40 will be maintained well above the ordinate five. As the bag resistance increases, suction on Sylphon 40 decreases and suction on Sylphon 41 increases. At a point depicting approximately twenty cubic feet of air flow per minute, the line C intersects the ordinate five and switch 42 closes and the control circuit is established. Again it will be noted that with a large orifice, the volume of air flow must be high to establish the requisite velocity of air at the nozzle and so the control circuit is established at a point representing less resistance by the bag, but at a point substantially uniform with respect to cleaning efficiency at the nozzle.

Again it is pointed out that Fig. 5 represents a schematic and graphic presentation of fundamental operating characteristics and it is not intended as an accurate quantitative analysis of any particular suction cleaner. Consideration of Fig. 5, however, will indicate that the present system is one in which the control circuit is established in response to a substantially uniform degree of cleaning efficiency and provides in addition thereto, a means for precluding actuation of the control when the hose is temporarily removed, but while the bag resistance is still low enough to permit efficient cleaning when suitable cleaning tools are applied. Obviously the lines A, B, C and D are merely suggestive of the characteristics of flow and suction under various conditions and are not intended to represent any particular type of nozzle or cleaning tool.

In further consideration of Fig. 5, it will be understood that the air flow and suction there depicted, corresponds to the normal operation of the cleaner and represents substantially ideal conditions. In actual operation, however, fluctuations will occur as, for instance, when a rug cleaning nozzle suddenly passes over the edge of a rug or when the nozzle is lifted and Fig. 5 has not been complicated by an attempt to depict such transient changes. One example of such conditions is, when the suction opening is completely blocked as by flat contact of the nozzle with a solid surface or when the hand is placed against the nozzle or hose. Such happenings produce surges, back pressures and swirling phenomena, which are usually temporary in nature and do not usually disturb the effectiveness of the present control. However, with reference to Fig. 4, it will be noted that in an apparatus in which such sudden pressure changes are so extreme as to inadvertently energize the control circuit, the time delay switch 58 may be inserted and thus although both switches 42 and 43 may be temporarily closed, they will not actuate the control until the condition becomes static, which would not have been the case had the switches responded to surges or the like.

It will be seen that while the present control system is responsive to pressure drop through the bag and hence to the amount of weight of accumulated dirt therein, the system is likewise responsive to air flow and to suction applied to the bag. Control systems for the actuation of signals and indicators have heretofore been proposed responsive to such conditions. In no former system, however, has the control been responsive to combined suction relationships, nor has it been responsive to cleaning efficiency as determined by nozzle flow velocity. In the present system, while the Sylphon 40 appears in most instances to be the primary controlling factor, the Sylphon 41 acts to prevent operation of the control when with a clean bag the hose is removed or when with a clean bag voltage drop occurs which reduces the total pressure drop through the system.

In the operation of the device with the parts as indicated in Fig. 1 and with the motor not energized, the Sylphon 40 associated with the inlet tube of the cleaner retains the microswitch 42 closed, while the Sylphon 41 associated with the housing 18 retains the microswitch 43 open, these being the normal inoperative setting for the microswitches. In such inoperative condition it will be understood the switch 16 has been so actuated as to break the circuit to the motor 11. When the device is to be used, the switch 16 is actuated to close the circuit to the motor 11 whereupon the fan is operated as a suction device, thus establishing a suction in the chamber 18. With a clean bag the action of the fan will thus cause a substantially similar suction in the tube 31, hose 28, wand W, and nozzle N, thereby causing a rapid inflow of air through the nozzle. Such suction in the chamber 18 causes an actuation of the Sylphon 41 which will close the microswitch 43 which would otherwise establish the control circuit. However, since the reduction in pressure in the housing 18 is substantially the same as that in the tube 31, the Sylphon 40 will be actuated to open the microswitch 42, thus preventing the establishing of the circuit.

As the cleaning continues, pores and interstices of the bag 19 become clogged and there is a continuously increasing pressure drop through the bag. This pressure drop is continuously reflected by the Sylphons 40 and 41. When the suction in the tube 31 falls below five inches of water, resulting in a diminishing of air flow through the nozzle, the Sylphon 40 will resume its inoperative closed position. If such increase in pressure takes place while the fan is operating and while suction is thus applied to the bag 19, the control circuit will be completed since under such circumstances the Sylphon 41 is retaining the microswitch 43 closed. In other words, in response to predetermined pressure drop through the bag, or rate of air flow, as represented by a predetermined amount of suction difference between the suction of the tube 31 and the chamber 18, the circuit will be established. When such pressure drop is a result of accumulated dirt in the bag 19, the pressure drop will be maintained and the microswitches will then be closed, thus actuating the latch 24 to open the cover and simultaneously therewith energizing coil 57 to open the switch 16 thus de-energizing the motor 11. The cleaner will then be in the position shown in Fig. 2 with the bag 19 presented for disposal. After the bag is emptied or replaced by a clean bag, the housing 18 is lowered to the horizontal position shown in Fig. 1 and the cover is closed whereupon the latch 24 acts to retain the cover closed and the housing in operative position. The device is then ready for another cycle of operation.

From the foregoing, it will be seen that the present invention provides an effective control system accurately responsive to suction differences in a fluid flow system and one which is particularly adapted for use in vacuum cleaners as a means responsive to the cleaning efficiencies of such devices. Obviously, the invention is not limited to the specific embodiment or application here illustrated. Numerous changes in design, application, and the full use of equivalents may be resorted to without departure from the spirit or scope of the invention as outlined in the appended claims.

What I claim is:

1. In a vacuum cleaner, a housing, a dust separating member in said housing, means for producing flow of air through said member, a first air pressure responsive device operable in response to an increase in pressure ahead of said member, a second air pressure responsive device operable in response to a decrease in pressure behind said member to a value less than the pressure at which said first device is operable, and means actuated in response to concurrent operation of said devices.

2. In a vacuum cleaner, a housing having an inlet opening, means for producing flow of air into said housing through said inlet, a dust separating member in said housing in the path of air flow between said inlet and said means, a first air pressure responsive device operable in response to an increase in pressure ahead of said member, a second air pressure responsive device operable in response to a decrease in pressure between said member and said means, to a value less than the pressure at which said first device is operable, and means actuated in response to concurrent operation of said devices.

3. In a vacuum cleaner, a housing having an inlet opening, means for producing flow of air into said housing through said inlet, a dust separating member in said housing in the path of air flow between said inlet in said means, a first element movable in response to variations in air pressure ahead of said member, a first electric switch operable by movement of said element resulting from an increase in pressure, a second element movable in response to variations in air pressure between said member and said means, a second electric switch operable by movement of said second element resulting from a decrease in pressure to a value less than that effective to operate said first switch, an electric circuit including both of said switches, and means in said circuit actuated by concurrent operation of said switches.

4. In a vacuum cleaner, a housing having an inlet opening, means for producing flow of air into said housing through said inlet, a dust separating member in said housing in the path of air flow between said inlet in said means, a first element movable in response to variations in air pressure ahead of said member, a first electric switch closable by movement of said first element resulting from an increase in pressure, a second element movable in response to variations in air pressure between said member and said means, a second electric switch closable by movement of said second element resulting from a decrease in pressure to a value less than that effective to close said first switch, and electric circuit including both of said switches in series, and means in said circuit actuated by concurrent closing of said switches.

5. In a vacuum cleaner, a housing forming a dust separating chamber having an air inlet opening, means for producing flow of air into said chamber through said inlet, a dust separating member in said chamber in the path of air flow between said inlet and said means, a first air pressure responsive device operable in response to an increase in pressure in said inlet opening, a second air pressure responsive device operable in response to a decrease in pressure between said member and said means, to a value less than the pressure at which said first device is operable, and means actuated in response to concurrent operation of said devices.

6. In a vacuum cleaner, a housing forming a dust separating chamber having an air inlet opening, means for producing flow of air into said chamber through said inlet, a dust separating member in said chamber in the path of air flow between said inlet and said means, a first element movable in response to variations in air pressure in said inlet opening, a first electric switch operable by movement of said first element resulting from an increase in pressure, a second element movable in response to variations in air pressure between said member and said means, a second electric switch operable by movement of said second element resulting from a decrease in pressure to a value less than that effective to operate said first switch, an electric circuit including both of said switches, and means in said circuit actuated by concurrent operation of said switches.

7. In a vacuum cleaner, a housing having an inlet opening, means for producing flow of air into said housing through said inlet, a dust separating member in said housing in the path of air flow between said inlet in said means, a first bellows having its interior communicating with said path of air flow ahead of said member and its exterior subject to atmospheric pressure, a first switch operable in response to expansion of said bellows resulting from an increase in the pressure ahead of said member, a second bellows having its interior communicating with said path of air flow between said member and said means and its exterior subject to atmospheric pressure, a second switch operable in response to contraction of said second bellows resulting from a decrease in the pressure between said member and said means to a value less than that effective to operate said first switch, an electric circuit including both of said switches, and means in said circuit actuated by concurrent operation of said switches.

8. In a vacuum cleaner, a housing having an inlet opening, means for producing flow of air into said housing through said inlet, dust separating members in said housing in the path of air flow between said inlet in said means, a first element movable in response to variations in air pressure ahead of said member, a first electric switch closable by movement of said first element resulting from an increase in pressure, a second element movable in response to variations in air pressure between said member and said means, a second electric switch closable by movement of said second element resulting from a decrease in pressure to a value less than that effective to close said first switch, an electric circuit including both of said switches in series, a magnetic device in said circuit energized by concurrent closing of said switches, and a third switch operable by energization of said magnetic device for interrupting the supply of current to said circuit.

9. In a vacuum cleaner, a housing having an inlet opening, means for producing flow of air into said housing through said inlet, a dust separating member in said housing in the path of air flow between said inlet and said means, a closure on said housing providing access to said dust bag, latch means maintaining said closure in a closed position, a first element movable in response to variations in air pressure ahead of said member, a first electric switch closable by movement of said first element resulting from an increase in pressure, a second element movable in response to variations in air pressure between said member and said means, a second electric switch closable by movement of said second element resulting from a decrease in pressure to a value less than that effective to close said first switch, an electric circuit including both of said switches in series, a magnetic device in said circuit energized by concurrent closing of said switches, a third switch operable by energization of said magnetic device for interrupting the supply of current to said circuit, and another magnetic device in said circuit energized by concurrent closing of said switches and operable for releasing said latch means.

10. In a vacuum cleaner, a housing having an inlet opening, means for producing flow of air into said housing through said inlet, a dust separating member in said housing in the path of air flow between said inlet and said means, a first element movable in response to variations in air pressure ahead of said member, a first electric switch operable by said first element and normally closed when said first element is subject to atmospheric pressure, said first switch being opened when said first element is subjected to certain sub-atmospheric pressures, said first switch thereby being closable by further movement of said first element resulting from an increase in pressure above said sub-atmospheric pressures, a second element movable in response to variations in air pressure between said member and said means, a second electric switch operable by said second element and normally open at atmospheric pressure, said second switch being closable by movement of said element resulting from a decrease in pressure to a pressure substantially below atmospheric pressure, an electric circuit including both of said switches in series, and means in said circuit actuated by concurrent closing of said switches, whereby said circuit is actuated only in response to a predetermined sub-atmospheric pressure condition occurring concurrently ahead of said dust separating member and between said dust separating member and said means for producing flow of air.

11. In a vacuum cleaner, a housing having an inlet opening, a motor-fan unit for producing flow of air into said housing through said inlet, a dust separating member in said housing in the path of air flow between said inlet and said motor-fan unit, a closure on said housing providing access to said dust bag, latch means maintaining said closure in a closed position, a first element movable in response to variations in air pressure ahead of said member, a first electric switch closable by movement of said first element resulting from an increase in pressure, a second element movable in response to variations in air pressure between said member and said motor-fan unit, a second electric switch closable by movement of said element resulting from a decrease in pressure to a value less than that effective to close said first switch, an electric control circuit including both of said switches in series, a magnetic device in said circuit energized by concurrent closing of said switches, a third switch operable by energization of said magnetic device for interrupting the supply of current to said motor-fan unit and said control circuit, and another magnetic device in said circuit energized by concurrent closing of said switches and operable for releasing said latch means.

12. In a vacuum cleaner, a housing having an inlet opening, means for producing flow of air into said housing through said inlet, a dust separating member in said housing in the path of air flow between said inlet and said means, a first element movable in response to variations in air pressure ahead of said member, a first electric switch operable by said first element and normally closed when said first element is subject to atmospheric pressure, said first switch being opened when said first element is subjected to certain sub-atmospheric pressures, said first switch thereby being closable by further movement of said first element resulting from an increase in pressure above said sub-atmospheric pressures, a second element movable in response to variations in air pressure between said member and said means, a second electric switch operable by said second element and normally open at atmospheric pressure, said second switch being closable by movement of said second element resulting from a decrease in pressure to a pressure substantially below atmospheric pressure, and an electric circuit including a time delay switch and both of said switches in series, and means in said circuit actuated by concurrent closing of said switches.

13. In a vacuum cleaner, a housing having an inlet opening, means for producing flow of air into said housing through said inlet, a dust separating member in said housing in the path of air flow between said inlet and said means, an inlet conduit extending inwardly from said inlet opening and having its inner end extending into said dust separating member, said conduit having a cross section substantially less than that of said dust separating member, an electric control circuit, and means responsive to an increase in pressure in said inlet tube at a point spaced from the inner end thereof and to a concurrent decrease in pressure between said dust separating member and said means for producing flow of air for actuating said control circuit.

14. In a vacuum cleaner, a housing having an inlet opening, means for producing flow of air into said housing through said inlet, a dust separating member in said housing in the path of air flow between said inlet and said means, an inlet conduit extending inwardly from said inlet opening and having its inner end extending into said dust separating member, said conduit having a cross section substantially less than that of said dust separating member, a first tube communicating with said inlet conduit at a point spaced from the inner end thereof, a second tube communicating with said housing at a point between said dust separating member and said means for producing flow of air, an electric control circuit, and means responsive to an increase of pressure in said first tube and a decrease of pressure in said second tube for actuating said control circuit.

15. In a vacuum cleaner, a housing, a dust separating member in said housing, means for producing flow of air through said member, an electric control circuit, means for supplying current to said circuit, an electric switch for interrupting said supply, means operable by energization of said circuit for opening said switch, and electric switching means responsive to an increase in pressure ahead of said member and to a concurrent decrease in pressure behind said member for energizing said circuit.

16. In a vacuum cleaner, a housing, a dust separating member in said housing, a motor fan unit for producing flow of air through said member, an electric control circuit, means for supplying current to said motor and to said circuit, an electric switch for interrupting said supply, means operable by energization of said circuit for opening said switch, and electric switching means responsive to an increase in pressure ahead of said member and to a concurrent decrease in pressure behind said member for energizing said circuit.

17. In a vacuum cleaner, a housing having an opening, a dust separating member removable from said casing through said opening, a closure for said opening, means for producing flow of air through said member, an electric control circuit, means for supplying current to said circuit, an electric switch for interrupting said supply, means operable by energization of said circuit for opening said closure and for opening said switch, and electric switching means responsive to an increase in pressure ahead of said member and to a concurrent decrease in pressure behind said member for energizing said circuit.

18. In a vacuum cleaner, a housing having an opening, a dust separating member removable from said casing through said opening, a closure for said opening, a motor fan unit for producing flow of air through said member, a manually operable switch for turning on and off the supply of current to said motor, an electric control circuit connected to be supplied with current through said switch, means operable by energization of said circuit for opening said closure and for opening said switch, and electric switching means responsive to an increase in pressure ahead of said member and to a concurrent decrease in pressure behind said member for energizing said circuit.

*19. In a vacuum cleaner, a housing having an inlet opening, means for producing flow of air into said housing through said inlet, a dust separating member in said housing in the path of air flow between said inlet and said means, an inlet conduit extending inwardly from said inlet opening and having its inner end extending into said dust separating member, said conduit having a cross section substantially less than that of said dust separating member, a control means, and means operatively associated with said control means and responsive to an increase in pressure in said inlet tube at a point spaced from the inner end thereof and to a concurrent decrease in pressure between said dust separating member and said means for producing flow of air for actuating said control means.*

*20. In a vacuum cleaner, a housing having an air inlet, a fan having its suction connected to said housing for producing a flow of air therethrough from said inlet, a dust separating member in said housing in the path of flow of air through said housing, said air inlet comprising a conduit communicating with the interior of said dust separating member and having a cross-sectional area substantially less than that of said dust separating member, a control means, and fluid pressure means operatively associated with said control means, said fluid pressure means including a fluid passage connection to the space between said suction fan and dust separating member and a fluid passage connection into said conduit respectively and responsive during the operation of said fan to a decrease in pressure between said fan and dust separating member and to a concurrent increase in pressure in said conduit to actuate said control means.*

*21. In a vacuum cleaner, a housing having an air inlet, a fan having its suction connected to said housing for producing a flow of air therethrough from said inlet, a dust separating member in said housing in the path of flow of air from said inlet through said housing, a hinged member for said housing providing access to said dust separating member, releasable latch means for maintaining said hinged member in closed position, control means for releasing said latch means, said air inlet comprising a conduit communicating with the interior of said dust separating member and having a cross section substantially less than that of said dust separating member, and fluid pressure means operatively associated with said control means, said fluid pressure means including a fluid passage connection to the space between said suction fan and dust separating member and a fluid passage connection into said conduit and responsive during the operation of said fan to a decrease in pressure between said fan and dust separating member and to a concurrent increase in pressure in said conduit to actuate said control means for releasing said latch means.*

*22. In a vacuum cleaner, a housing having an air inlet, a fan having its suction connected to said housing for producing a flow of air therethrough from said inlet, an electric motor for*

*operating said fan, a dust separating member in said housing in the path of flow of air through said housing, an electric switch operable to interrupt supply of current to said motor, control means for operating said switch, said air inlet comprising a conduit communicating with the interior of said dust separating member and having a cross section substantially less than that of said dust separating member, and fluid pressure means including fluid passage connections to the space between said suction fan and dust separating member and to the interior of said conduit respectively and responsive during the operation of said fan to a decrease in pressure between said fan and dust separating member and to a concurrent increase in pressure in said conduit to actuate said control means to operate said switch.*

FERMAN C. DOUGHMAN.

REFERENCES CITED

The following references are of record in the file of this patent or the original patent:

UNITED STATES PATENTS

| Number | Name | Date |
|---|---|---|
| 1,880,859 | Davis | Oct. 4, 1932 |
| 1,904,973 | Smellie | Apr. 18, 1933 |
| 1,991,859 | Lofgren | Feb. 19, 1935 |
| 2,203,171 | Martinet | June 4, 1940 |
| 2,230,113 | Hein | Jan. 28, 1941 |
| 2,312,905 | Holm-Hansen | Mar. 2, 1943 |
| 2,320,368 | Leathers | June 1, 1943 |
| 2,343,732 | Baird | Mar. 7, 1944 |
| 2,350,938 | Sparrow | June 6, 1944 |
| 2,362,570 | McCleery | Nov. 14, 1944 |
| 2,386,209 | Goldsborough | Oct. 9, 1945 |
| 2,393,014 | Bartholy | Jan. 15, 1946 |
| 2,399,901 | Wald | May 7, 1946 |
| 2,410,293 | Kilto | Oct. 29, 1946 |
| 2,413,587 | Smellie | Dec. 31, 1946 |

FOREIGN PATENTS

| Number | Country | Date |
|---|---|---|
| 652,053 | Germany | Oct. 23, 1937 |